Oct. 13, 1925.
W. B. HODGE
1,557,163
SLING PSYCHROMETER
Filed May 19, 1923     2 Sheets-Sheet 1
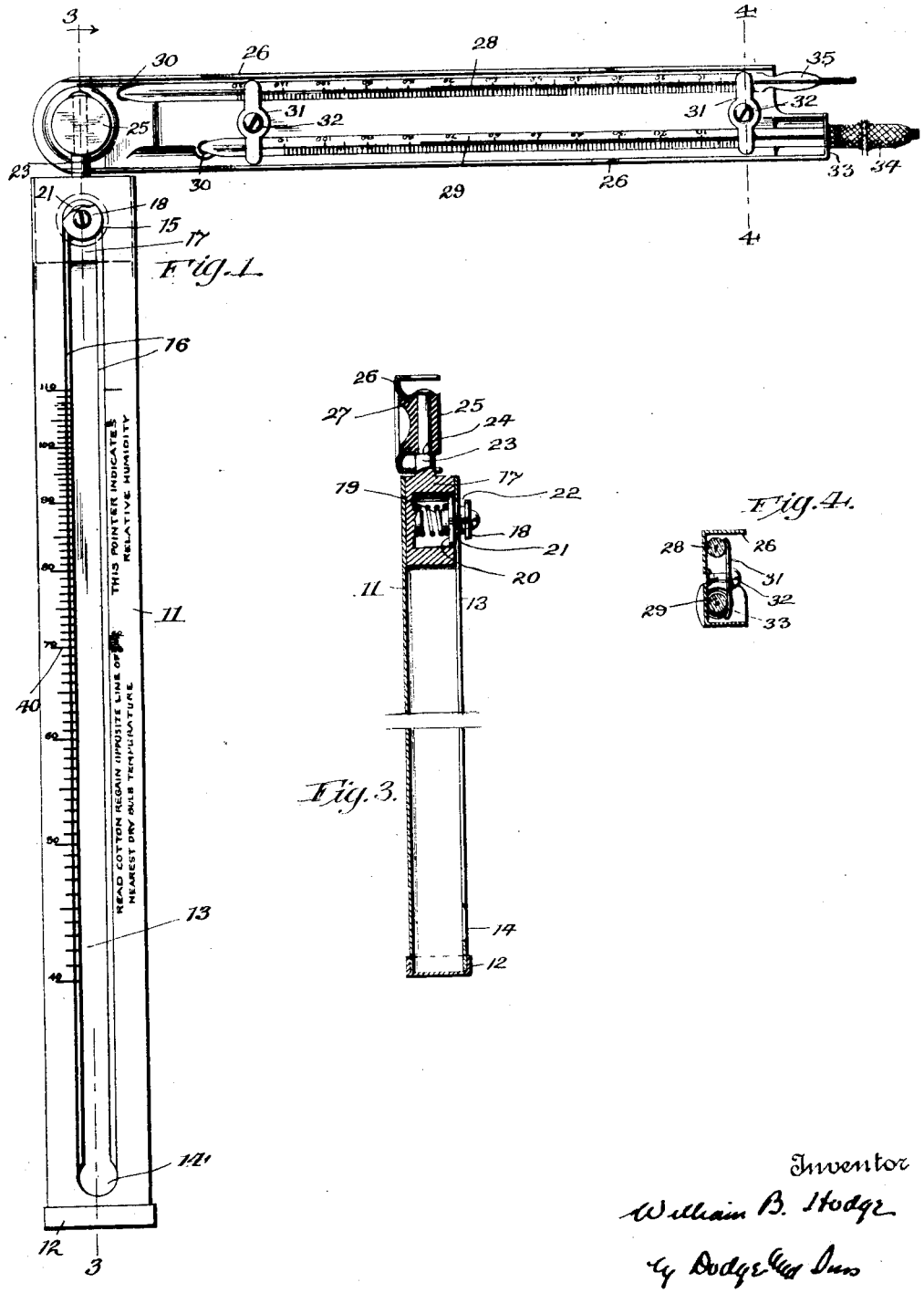

Oct. 13, 1925.  
W. B. HODGE  
SLING PSYCHROMETER  
Filed May 19, 1923  
1,557,163  
2 Sheets-Sheet 2
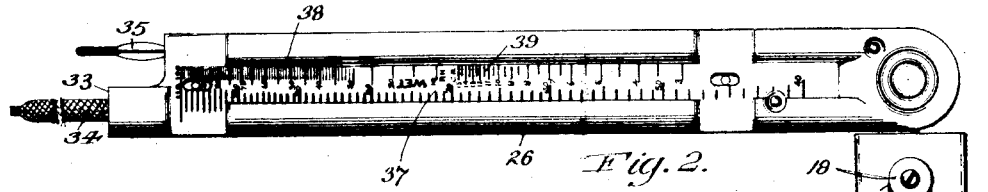
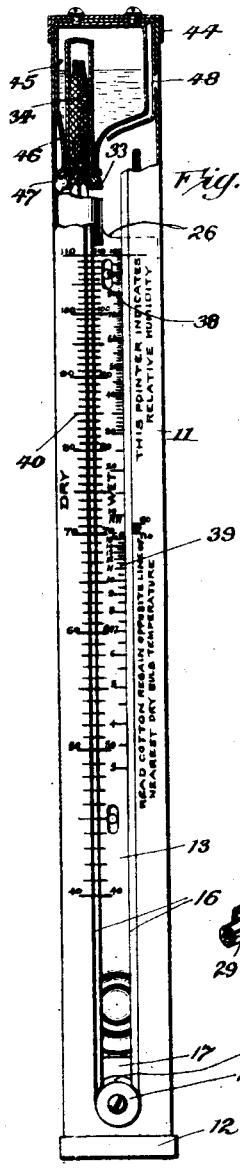
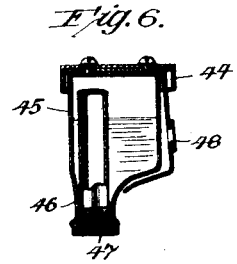
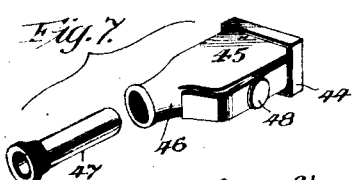
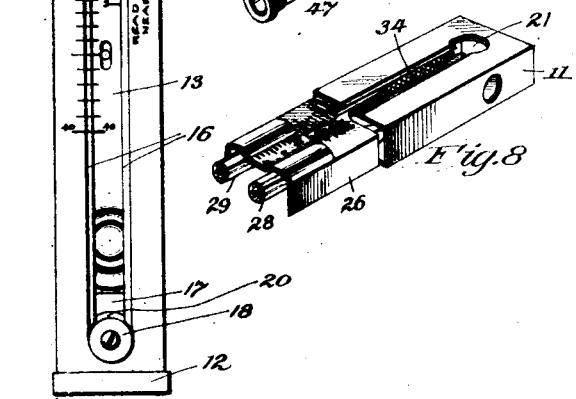
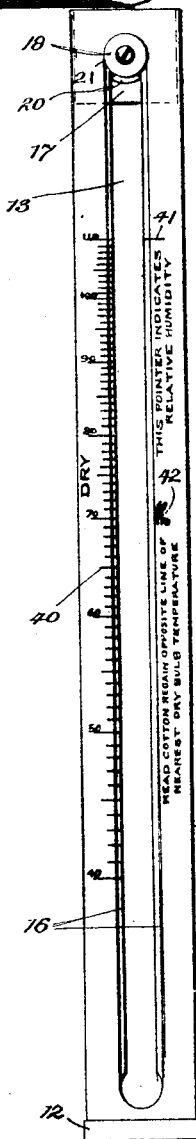

Patented Oct. 13, 1925.

1,557,163

UNITED STATES PATENT OFFICE.

WILLIAM B. HODGE, OF CHARLOTTE, NORTH CAROLINA.

SLING PSYCHROMETER.

Application filed May 19, 1923. Serial No. 640,282.

*To all whom it may concern:*

Be it known that I, WILLIAM B. HODGE, a citizen of the United States, residing at Charlotte, in the county of Mecklenburg and State of North Carolina, have invented certain new and useful Improvements in Sling Psychrometers, of which the following is a specification.

This invention relates to devices for determining relative humidity and particularly to sling psychrometers.

The object of the invention is to provide a pocket instrument which is compact, light and entirely self-contained.

Generally stated, the device includes a tubular member which serves alternately as a case and as a handle for a thermometer element rotatably mounted on a support longitudinally slidable in said tubular member.

The thermometer element includes a support for the wet bulb and dry bulb thermometers. Furthermore, the back of the thermometer element and one portion of the tubular member are so contrived and graduated that when the thermometer element is telescoped into the tubular element the two co-act as a slide or computing rule which, when set according to the readings of the wet and dry bulb thermometer, gives the relative humidity and the cotton regain either or both. An additional feature of the device is a combined closing cap and water bottle which latches to the open end of the tubular member and is convenient for use in moistening the absorbent wick on the wet bulb thermometer when using the device.

In the drawings:

Fig. 1 is a front elevation of the device opened out in position for use, the combined cap and water bottle being removed;

Fig. 2 is a similar view showing the thermometer element rotated through 180° from the position shown in Fig. 1 so as to show the graduated back which forms a part of the computing slide rule structure;

Fig. 3 is a section on the line 3—3 of Fig. 1;

Fig. 4 is a section on the line 4—4 of Fig. 1;

Fig. 5 is a front elevation of the complete device in closed position, parts being broken away to illustrate the position assumed by the combined cap and water bottle;

Fig. 6 is an axial section of the combined cap and water bottle removed;

Fig. 7 is a perspective view of the combined cap and water bottle and its stopper, separated from each other, and Fig. 8 is a fragmentary perspective view showing the relation between the tubular handle element and the thermometer element in the closed position of the device.

The tubular handle member is indicated at 11 and is permanently closed at one end by a cap 12. The member 11 is rectangular in cross section and is formed on one of its wider faces with a longitudinal slot 13. This slot terminates near the ends of the tubular member and is itself formed at its opposite ends with circular enlargements 14 and 15. Both side edges of the slot 13 are beveled, as indicated at 16, the purpose of so beveling them being to eliminate parallax in reading certain graduations applied to them as hereinafter described.

A block 17 is longitudinally slidable in the tubular member 11 and carries a latch which projects through the slot 13 and serves to limit the longitudinal sliding movement of the block. The latch consists of a button member 18 which is housed in a recess in the block 17 and which is urged outward by a coil spring 19, the parts being formed and arranged as best shown in Fig. 3. The latch button 18 is formed with a flange 20 near its rear end, the flange serving to limit the outward movement of the button since it is larger than any portion of the slot 13. Forward of the flange 20 is a groove or neck 22 which is slightly less in diameter than the width of the main portion of the slot 13. Between the neck 22 and the rear flange 20 is a circular portion 21 which may enter either of the circular enlargements 14 or 15 at the ends of the slot 13, but which is wider than the main portion of the slot 13. By pushing the button 18 inward so that the groove 22 receives the edges of the slot 13, the block 17 may be slid from end to end of the tubular member 11.

At the opposite limits of motion the spring 19 forces the button 18 outward so that the circular portion 21 enters the circular enlargements 14 and 15, as the case may be, and locks the block 17 against longitudinal motion in the tubular member 11. Under these conditions the flange 20 limits the outward movement of the latch button. Other latch mechanisms may be used but the one described is preferred because the latch co-acts conveniently with the groove 13 which forms a part of the computing device hereinafter described.

Formed integrally with the block 17 is a stud 23 which is shouldered at 24 and receives beyond the shoulder a rotatable block 25. The block 25 is retained by riveting over the end of the stud in such a way as to leave the block 25 free to rotate.

Swiveled on the block 25 is a channel-shaped member 26 which serves as a support for the wet bulb and dry bulb thermometers. This member 26 is connected with the block 25 by spinning down a circular flange 27 formed integrally with the block 25. This offers an inexpensive swivel connection characterized by some friction, as it is not desirable that the member 26 swing freely on the block 25.

The member 26 is somewhat less in length than the tubular member 11 and is so formed as to support and house two thermometers, one of which, the dry bulb thermometer, is indicated at 28, and the other of which, the wet bulb thermometer is indicated at 29.

The upper ends of these thermometers have, as is usual, small projections which enter the recesses 30, formed in the member 26, to receive them and hold the thermometers against longitudinal movement.

The thermometers are further held by two clips 31 which overlie them and which are releasably held by screws 32. The wet bulb thermometer 29 passes through a shield or guard 33, formed on the member 26, to receive it and beyond the guard 33 its bulb is covered by an absorbent wicking 34. The member 26 is cut away to expose the bulb 35 so that when the member 26 is swung around on the stud 23 both thermometer bulbs are freely exposed to contact with the air. This is clearly illustrated in Figs. 1 and 2.

Referring to Fig. 2, it will be observed that the back of the member 26 has at its center a logarithmic scale 37 representing wet bulb temperatures, a humidity scale 38 which extends outward from the letters R H (relative humidity) toward one end of the member 26 and a cotton regain scale 39 which extends from the letters C R (cotton regain) toward the other end of the member 26.

The tubular member 11 is provided with a logarithmic series of graduations 40 for dry bulb thermometers, a relative humidity index 41 and a series of cotton regain indices 42. These different indices correspond with different dry bulb temperatures. These various scales and indices are identified by legends on the device as is clearly illustrated in the drawings.

By swinging the member 26 into line with the tubular member 11 and then releasing the latch 18, the block 17 and member 26 may be telescoped into the tubular member 11. By setting any determined dry bulb temperature on the scale 40 against any simultaneously determined wet bulb temperature on the scale 37, the scales are so co-ordinated that index 41 will be opposite the corresponding relative humidity on scale 38. Similarly, under these conditions that one of the indices 42 which most closely corresponds to the dry bulb temperature will indicate the cotton regain on scale 39. The exact nature of the graduations on the several scales is subject to variation and is not a feature of the present invention which contemplates the use of any scale or scales adaptable to this structure and capable of computing relative humidity and cotton regain either or both from the dry and wet bulb reading. The particular graduations illustrated herein form the subject matter of my application Serial No. 608,634, filed Dec. 23rd, 1922, and hence are not claimed herein.

When the block 17 and member 26 are at the limit of their inward motion into tubular member 11, the latch 18 enters the enlarged aperture 14 and locks the parts in position.

When the parts are in this position, the open end of the tubular member 11 may be closed by a cap 44 to which is attached a small water bottle 45, formed of metal and so shaped that its neck 46 is coaxial with the wick-covered end 34 of the wet bulb thermometer 29. The neck 46 of the bottle 45 is closed by a threaded cup-shaped stopper 47 which projects into the bottle 45 and which therefore serves as a sheath to receive the bulb end of the thermometer. The cap 44 is latched in place on the tubular member by a spring latch 48 which enters an aperture formed in the tubular member 11 to receive it.

The closed position of the device is clearly shown in Fig. 5. To prepare the device for use, the latch 48 is pressed in, permitting the removal of the cap 44 and its connected bottle 45. The latch button 18 is then pressed in and slid longitudinally to the opposite end of the slot 13 where it is allowed to engage in the enlarged recess 15. The thermometer element 26 is then swung over to one side to the position illustrated in Figs. 1 and 2. The member 26 is arrested in this position by the collision of one of its flanges with the stub 23, as clearly shown in Figs. 1 and 3.

The wick 34 is then moistened by inserting the wick-covered end of the thermometer 29 through the neck of the bottle 45, after removing the stopper 47 from bottle 45. The tubular member 11 is then grasped in the user's hand and given a whirling motion so that the thermometer element 26 is rapidly swung in a circular path. A number of readings are taken until the user is assured that the wet bulb thermometer has reached its lowest reading. The readings of the two thermometers are then taken.

The member 26 is swung into line with the tubular member 11 and the parts are telescoped together, as hereinbefore described, until the wet bulb reading and dry bulb reading are brought together on the corresponding scales 37 and 40. The relative humidity and cotton regain are then indicated by the indices 41 and 42.

The device may then be closed by engaging the latch 18 in recess 14 and reapplying the cap 44 after screwing the stopper 47 into the bottle 45.

It will be observed that in the closed position the thermometers are entirely housed and are effectively protected from injury. The device is entirely self-contained and requires no carrying case. The accompanying drawings show the device approximately full size. By using aluminum or some relatively light alloy, the device is made quite light and is suited to be carried in the pocket.

Obviously, various structural changes may be made without departing from the spirit of the invention and I do not limit myself to the specific form illustrated, except to the extent specified in the claims. While I illustrate the slide rule as arranged to compute relative humidity and cotton regain, these are obviously both functions of atmospheric humidity and scales may be devised to compute any desired function of atmospheric humidity in a similar manner so that I imply no necessary limitations to the particular functions disclosed. In the claims I use the term "function of atmospheric humidity" in this general sense.

What is claimed is:

1. In a psychrometer or the like, the combination of a thermometer element including a wet bulb thermometer, a dry bulb thermometer and a support therefor; and a casing element for said thermometer element capable of entering into slidable relation therewith, said two elements being provided with coacting series of slide rule graduations arranged for computing a function of atmospheric humidity from the readings of the wet bulb and dry bulb thermometers.

2. In a psychrometer or the like, the combination of a thermometer element including a wet bulb thermometer, a dry bulb thermometer and a thermometer support; a member to which said thermometer support is swiveled; and a casing element into which said thermometer element is longitudinally slidable, said two elements being provided with coacting slide rule graduations arranged for computing a function of atmospheric humidity from the readings of said wet bulb and dry bulb thermometers.

3. In a psychrometer or the like, the combination of a thermometer element including a wet bulb thermometer, a dry bulb thermometer and a support therefor; a combined handle and casing for said thermometer element; and a swivel connection between said handle and said thermometer element, constructed and arranged to permit said thermometer element to be swung around said handle as a support, in one position of the parts, and to be housed therein, in another position of the parts.

4. In a psychrometer or the like, the combination of a thermometer element including a wet bulb thermometer, a dry bulb thermometer and a support therefor; a hollow handle; a member mounted for limited longitudinal movement in said handle; and a swivel connection between said member and said thermometer element, the parts being so constructed and arranged that the thermometer element can alternatively be swung around the handle or be slid longitudinally into said handle, and be enclosed thereby when not in use.

5. In a psychrometer or the like, the combination of a thermometer element including a wet bulb thermometer, a dry bulb thermometer and a support therefor; a hollow handle; a member mounted for limited longitudinal movement in said handle; and a swivel connection between said member and said thermometer element, the parts being so constructed and arranged that the thermometer element can alternatively be swung around the handle or be slid longitudinally into said handle, and be enclosed thereby when not in use, the handle and the thermometer element being provided with coacting slide rule graduations arranged for computing a function of atmospheric humidity from the readings of said wet bulb and dry bulb thermometers.

6. In a psychrometer or the like, the combination of a thermometer element including a wet bulb thermometer, a dry bulb thermometer and a support therefor; a combined handle and casing for said thermometer element; a swivel connection between said handle and said thermometer element, constructed and arranged to permit said thermometer element to be swung around said handle as a support, and to be housed therein, and a closure for said combined handle and casing provided with a water-containing receptacle.

7. In a psychrometer or the like, the combination of a thermometer element including a wet bulb thermometer, a dry bulb thermometer and a support therefor; a hollow handle having an open end, a member mounted for limited longitudinal movement on said handle, a swivel connection between said member and said thermometer element, the parts being so constructed and arranged that the thermometer element can alternatively be swung around the handle or be slid longitudinally through the open end of said handle and be housed within the latter; and a water container removably mounted in the open end of the handle and serving to close the same when the thermometer element is housed therein.

8. The combination of a tubular member adapted to serve alternatively as a handle and as a casing, and formed with a longitudinally extending slot; a block longitudinally slidable in said tubular member; a stop means carried by said block, extending through said slot and serving to arrest motion of said block at opposite ends of said slot; and a thermometer element hingedly mounted on said block and including a support and wet and dry bulb thermometers carried thereby, the parts being so constructed and arranged that in one limiting position of the block the thermometer element may be swung around the tubular member, and in the other limiting position thereof the thermometer element is housed within the tubular member.

9. The combination of a tubular member adapted to serve alternatively as a handle and as a casing, and formed with a longitudinally extending slot; a block longitudinally slidable in said tubular member; a stop means carried by said block, extending through said slot and serving to arrest motion of said block at opposite ends of said slot; and a thermometer element hingedly mounted on said block and including a support and wet and dry bulb thermometers carried thereby, the parts being so constructed and arranged that in one limiting position of the block the thermometer element may be swung around the tubular member, and in the other limiting position thereof the thermometer element is housed within the tubular member; said tubular member, and said support being provided with slide rule graduations, coacting at the margin of the slot in said tubular member and arranged to compute a function of atmospheric humidity from the readings of the wet bulb and dry bulb thermometers.

10. The combination of a tubular member adapted to serve alternatively as a handle and as a casing, and formed with a longitudinally extending slot, a block longitudinally slidable in said tubular member, a stop means carried by said block, extending through said slot and serving to arrest motion of said block at opposite ends of said slot, a thermometer element hingedly mounted on said block and including a support and wet and dry bulb thermometers carried thereby, the parts being so constructed and arranged that in one limiting position of the block the thermometer element may be swung around the tubular member, and in the other limiting position thereof the thermometer element is housed within the tubular member; and a removable closure for one end of the tubular member, provided with a water container so arranged as to fit over the bulb of the wet bulb thermometer when the thermometer element is housed in the tubular member.

In testimony whereof I have signed my name to this specification.

WILLIAM B. HODGE.